(12) United States Patent
Immer et al.

(10) Patent No.: US 6,782,753 B1
(45) Date of Patent: Aug. 31, 2004

(54) THERMODYNAMIC PRESSURE/ TEMPERATURE TRANSDUCER HEALTH CHECK

(75) Inventors: Christopher D. Immer, Merritt Island, FL (US); Anthony Eckhoff, Cocoa, FL (US); Pedro J. Medelius, Merritt Island, FL (US); Richard T. Deyoe, NE. Palm Bay, FL (US); Stanley O. Starr, Indialantic, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/994,990

(22) Filed: Nov. 9, 2001

Related U.S. Application Data
(60) Provisional application No. 60/247,848, filed on Nov. 9, 2000.

(51) Int. Cl.$^7$ .............................. G01L 7/00; G01L 7/16; G01L 9/14
(52) U.S. Cl. .............................. 73/744; 73/745; 73/722; 73/728
(58) Field of Search .......................... 73/722, 728, 744, 73/745, 708, 706, 4, 1.57, 754, 151; 137/320, 554; 600/538

(56) References Cited

U.S. PATENT DOCUMENTS

| | | | |
|---|---|---|---|
| 2,207,898 A | 7/1940 | Schoenecke | |
| 3,375,721 A | 4/1968 | Joesting et al. | |
| 3,777,546 A | 12/1973 | Rollins | |
| 4,658,829 A | 4/1987 | Wallace | |
| 4,665,753 A | * 5/1987 | Bertrand | ...................... 73/706 |
| 4,698,998 A | 10/1987 | Varnagy | |
| 4,730,789 A | * 3/1988 | Geiger | ........................ 241/69 |
| 4,776,201 A | 10/1988 | Jones | |
| 4,930,361 A | * 6/1990 | Nimberger | ............... 73/864.62 |
| 5,238,022 A | * 8/1993 | Zink | ........................... 137/554 |
| 5,578,770 A | * 11/1996 | Welker | ..................... 73/864.81 |
| 5,582,064 A | * 12/1996 | Kluth | .......................... 73/1.57 |
| 5,747,674 A | * 5/1998 | Moracchini et al. | ....... 73/61.44 |
| 5,853,005 A | 12/1998 | Scanlon | |

* cited by examiner

Primary Examiner—Andrew H. Hirshfeld
Assistant Examiner—Marissa Ferguson
(74) Attorney, Agent, or Firm—Randall M. Heald; Gary G. Borda; Harry Lupuloff (57) ABSTRACT

A device and procedure for checking the health of a pressure transducer in situ is provided. The procedure includes measuring a fixed change in pressure above ambient pressure and a fixed change in pressure below ambient pressure. This is done by first sealing an enclosed volume around the transducer with a valve. A piston inside the sealed volume is then driven forward, compressing the enclosed gas, thereby increasing the pressure. A fixed pressure below ambient pressure is obtained by opening the valve, driving the piston forward, sealing the valve, and then retracting the piston. The output of the pressure transducer is recorded for both the overpressuring and the underpressuring. By comparing this data with data taken during a preoperative calibration, the health of the transducer is determined from the linearity, the hysteresis, and the repeatability of its output. The further addition of a thermometer allows constant offset error in the transducer output to be determined.

8 Claims, 7 Drawing Sheets

Fig. 1

Transducer Output Versus Temperature and Pressure

Transducer Output During Decreasing Pressure

*Fig. 5*

Transient Pressure response of the piston compressing the enclosed gas

*Fig. 6*

Transient Temperature response of the piston compressing the enclosed gas

*Fig. 7*

THERMODYNAMIC PRESSURE/ TEMPERATURE TRANSDUCER HEALTH CHECK

CROSS REFERENCE TO RELATED APPLICATIONS

This application is related to and claims the benefit of the filing date of U.S. Provisional Application Ser. No. 60/247,848, filed on Nov. 9, 2000 (incorporated by reference).

ORIGIN OF THE INVENTION

The invention described herein was made in the performance of work under a NASA contract and is subject to the provisions of Public Law 96-517 (35 U.S.C. §202) in which the contractor has elected not to retain title.

TECHNICAL FIELD OF THE INVENTION

The present invention relates generally to transducers and in particular the present invention relates to in situ testing of transducers.

BACKGROUND OF THE INVENTION

Pressure transducers are widely used in industry to provide active measurements of pressure. These transducers are typically calibrated during manufacturing and may need to be re-calibrated during its lifetime. Determining that a transducer requires re-calibration can be difficult. That is, an unexpected measurement output of a pressure transducer could indicate a problem with the transducer or an accurate measurement of an unexpected pressure condition. Additional testing may be necessary to determine if an accurate measurement was provided, or if the transducer is not operating properly. This additional testing may require that the transducer be removed from its operating environment for testing. This can create a problem in systems where the transducers cannot be easily accessed. For example, it is not possible to access transducers that are located in a deployed satellite or planetary exploration vehicle.

Presently, when a transducer failure occurs in a remote location, a great deal of effort and expense is expended to determine whether there truly is a problem with the transducer or whether a suspicious measurement is involved with the particular failed parameter. When space missions are planned, wide margins of safety are used to compensate for the degradation of the measurement devices installed over time. These safety margins result in extra fuel usage during launch, increased signal conditioning and telemetry requirements to support the extra measurements, and increased costs associated with these needs. During a mission emergency, the need to determine if there is a parameter or measurement failure increases the possibility of erroneous decision making, thereby unnecessarily jeopardizing the mission.

For the reasons stated above, and for other reasons stated below which will become apparent to those skilled in the art upon reading and understanding the present specification, there is a need in the art to accurately determine the health of a measurement device since its last calibration by an in situ check of the sensor's major operating parameters. It would be even better if this could be periodically performed and adjustments made to compensate for the degradation of the device over time. This would yield a better evaluation of system performance for a longer period of time.

SUMMARY OF THE INVENTION

The above-mentioned problems with transducer testing and other problems are addressed by the present invention and will be understood by reading and studying the following specification.

In one embodiment, a pressure transducer test apparatus comprises a fitting to receive a pressure input, an output to receive a pressure transducer, and a valve attached to the fitting near the input. The fitting has a variable pressure chamber with first and second selectable internal volumes between the valve and the output.

In another embodiment, a pressure transducer test apparatus comprises a fitting to receive a pressure input, an output to receive a pressure transducer, a valve attached to the fitting near the input, and a piston provided in the fitting. The piston can be remotely moved between two positions. In the piston's first position, the fitting has an initial volume between the valve and the output, and in the piston's second position, the fitting has a different internal volume between the valve and the output A method of in situ testing a pressure transducer comprises measuring a first internal pressure in a fitting using the pressure transducer, changing an internal volume of the fitting to change the internal pressure, measuring a second internal pressure in the fitting using the pressure transducer, and comparing the measured first and second internal pressures to historical pressure readings.

A method of health checking a calibrated transducer comprises recording a sensitivity, linearity, hysteresis and repeatability of the transducer during calibration, checking the sensitivity, linearity, hysteresis and repeatability of the transducer in the operation environment, and comparing the recorded values of the transducer with the checked values of the transducer to determine the health of the transducer.

In another embodiment, a pressure transducer test apparatus comprises a fitting to receive a pressure input, an output to receive a pressure transducer, a valve attached to the fitting near the input, and a piston provided in the fitting. The piston can be remotely moved between first and second positions. The fitting has a first internal volume between the valve and the output when the piston is in the first position, and the fitting has a second internal volume between the valve and the output when the piston is in the second position. The fitting also contains a temperature measuring device so that pressure and temperature may be measured simultaneously, and with sufficient rapidity, to allow the quantity of entrapped gas to be estimated thereby providing an estimate of the absolute pressure value. This allows the detection and correction of offset errors.

DETAILED DESCRIPTION OF THE DRAWINGS

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

One embodiment of the present invention is able to determine a change in sensitivity, linearity, hysteresis, and repeatability of a pressure transducer remotely. This decreases the amount of redundant measurements required for system parameter determination of pressure and it decreases the time and possible error sources during a mission emergency. It also extends the life of pressure measurements installed in an operating environment by reducing the number of times a pressure transducer requires removal from a system for a laboratory calibration.

Other aspects of the invention include a technique that allows for the determination of a mass of enclosed gas used in the pressure/temperature transducer health check process. The time decay of pressure/temperature adds an additional health check for each transducer. A relation is defined from the temperature transducer to the pressure transducer so that, if either is malfunctioning, both parameters are still measurable. Also, the invention provides for finding and correcting a constant offset error in the pressure transducer output.

Definitions of some terms used in the present description are:

Sensitivity—The ratio of the change of the transducer output to a change in the value measured (sensitivity=response).

Linearity—The closeness of a calibration curve to a specified straight line between endpoints. Linearity is expressed as the maximum deviation of any calibration point on a specified straight line during any one calibration cycle.

Hysteresis—The maximum difference in output at any measured value within the specified range, when the value is approached first with increasing and then decreasing measured.

Repeatability—The ability of a transducer to reproduce output readings when the same measurand value is applied to it consecutively, under the same conditions, and in the same direction.

Presently, after deployment on a mission or in the field, confirmation of these terms cannot be performed without removing the device and returning it to a laboratory for use with the standards equivalent to the ones used in the original calibration. The present invention provides a device and process to remotely check these parameters for changes that have taken place, since a formal calibration was performed, without removing the pressure transducer from the operating environment. This "health check" can be performed without wasting any of the commodities being monitored.

One of the major parameters that deteriorate is the sensitivity. This can be due to many factors, mostly related to the signal conditioning and electronic portion of the transducer. A technique for this part of the health check is used throughout the measurement industry. It involves the use of a shunt calibration resistor or a replacement calibration signal. The shunt calibration resistor is determined during a baseline calibration using:

$$Rc = \left(\frac{R_a}{4} \frac{E_x}{E_o} - 2\right) \quad (1)$$

Where
Rc=Value of the calibration resistor in ohms
Ra=Value of resistance of one leg of the bridge
$E_x$=Value of the excitation voltage in volts dc
$E_o$=Value of the change in output voltage due to the introduction of the shunt calibration resistor into the bridge circuit.

Any difference in the value of $E_o$ recorded during the calibration and the $E_o$ noted during the health check may be assumed to be a difference in sensitivity of the electronic associated with the measurement and is described by:

$$\frac{R_{ac}E_{xc}}{2R_{ac}+4R_{cc}} = \frac{R_{ah}E_{xh}}{2R_{ah}+R_{ch}} \quad (2)$$

The major reason sensitivity changes in a strain gauge device is a change in excitation. This can be shown by:

$$\frac{R_{ac}E_{xc}}{2R_{ac}+4R_{ch}} = \frac{R_{ah}E_{xh}}{2R_{ah}+4R_{ch}} \quad (3)$$

$$R_{ac}E_{xc} = R_{ah}E_{xh}$$

$$E_{xc} = E_{xh}$$

Where: $R_{cc}$=Value of the calibration resistor in ohms determined during calibration. $R_{ac}$=Value of resistance of one leg of the bridge determined during calibration. $E_{xc}$=Value of the excitation voltage in volts dc determined during calibration. $E_{oc}$=Value of the change in output voltage due to the introduction of the shunt calibration resistor into the bridge circuit determined during calibration. $R_{ch}$=Value of the calibration resistor in ohms determined during the health check. $R_{ah}$=Value of resistance of one leg of the bridge determined during the health check. $E_{xh}$=Value of the excitation voltage in volts dc determined during the health check. $E_{ch}$=Value of the change in output voltage due to the introduction of the shunt calibration resistor into the bridge circuit determined during the health check.

It may be assumed that any change in signal conditioning amplification is a change in sensitivity of the measurement already described. By comparing the health check sensitivity with the sensitivity determined during calibration, an adjustment may be made mathematically to lengthen the time between calibrations.

Figure 1:
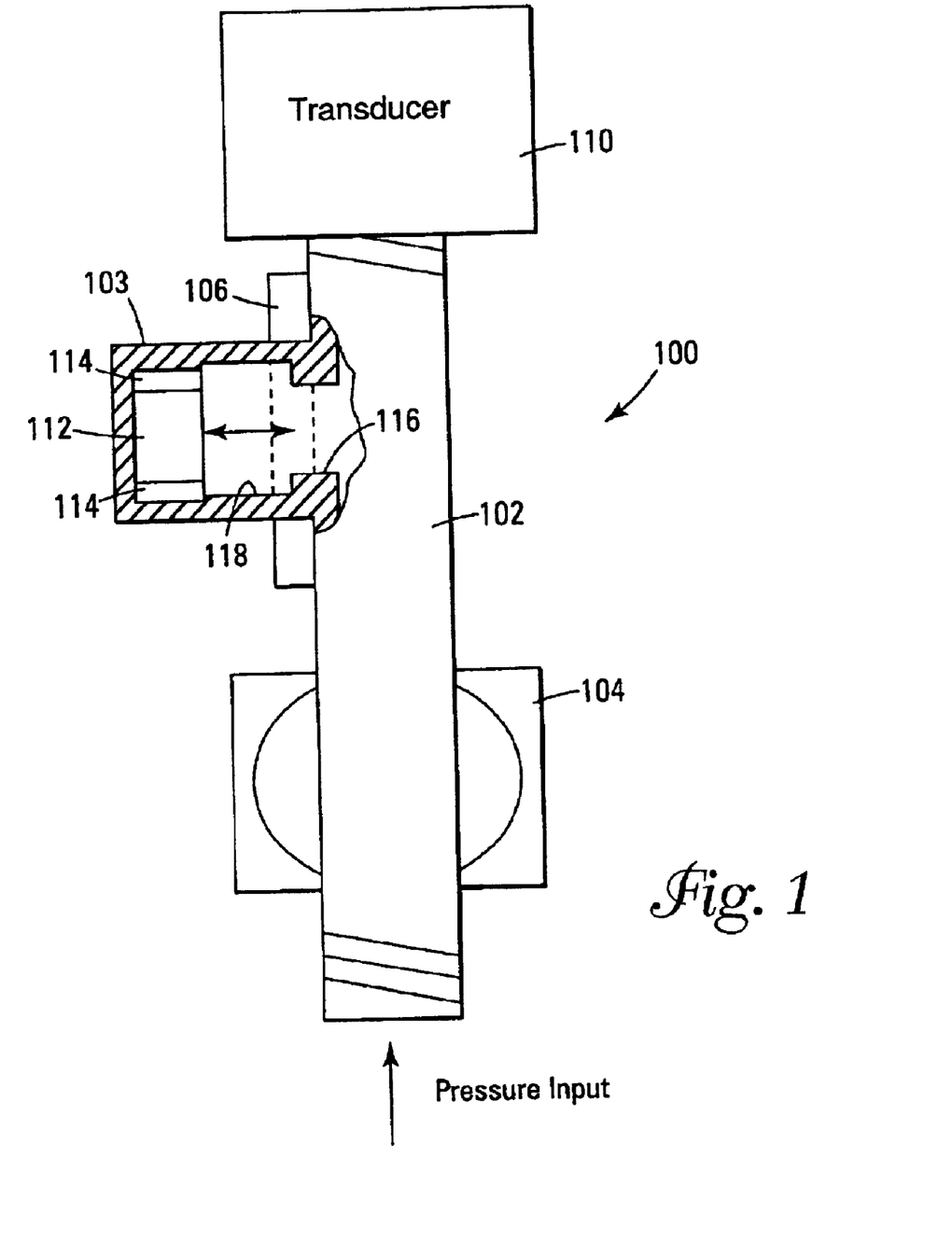
FIG. 1 illustrates a pressure transducer test apparatus of one embodiment of the present invention.

Referring to FIG. 1, an embodiment of a transducer check apparatus is described. The apparatus 100 includes a tube or fitting 102 that is coupled on one end to a transducer 110. An opposite end of the fitting is coupled to receive a pressure input. The fitting, therefore, provides a coupling to the transducer. A ball valve 104 is provided to seal the fitting from the pressure input. The ball valve can be manually activated and/or activated in response to a remote signal.

A piston 112 is located within a secondary region 103 of the fitting. The piston includes seals 114 which are in contact with an inner surface 118 of the fitting. The piston can be moved, as indicated by the arrow, in response to a ring electromagnet 106. That is, the ring electromagnet can move the piston in toward shoulder stop 116 or outward from the shoulder stop. The configuration of the fitting can be changed without departing from the present invention. For example, the illustrated fitting has a primary tube 102 having a first end coupled to the transducer and a second end to receive the pressure input. A secondary tube 103 is coupled to the primary tube, between the first and second ends. The secondary tube is coupled to the primary tube in a perpendicular manner. The secondary tube can be coupled at an angle or even parallel to the primary tube. In addition, the term 'tube' is used herein to define any component having an outer wall and an interior hollow core. As such, the tubes and piston can have non-circular cross-sections and are not limited to circular cross-sectioned components. The fitting can be constructed using metal, plastic or other suitable composite material. In one embodiment, the piston and ball valve are moved using magnetic forces, and the fitting should have non-magnet properties in this embodiment.

Closing the ball valve 104 and moving the piston change the volume, and therefore pressure, inside the fitting, as explained below. This pressure change is used to in situ test the transducer. By adding the fitting between the system being monitored and the transducer, a variable pressure chamber is formed and the diaphragm of the transducer can be checked for changes. These changes manifest themselves as changes in linearity, hysteresis, and repeatability. The measured fitting pressure is compared to historical measurement reading that were recorded, for example during initial calibration testing.

Figure 2:
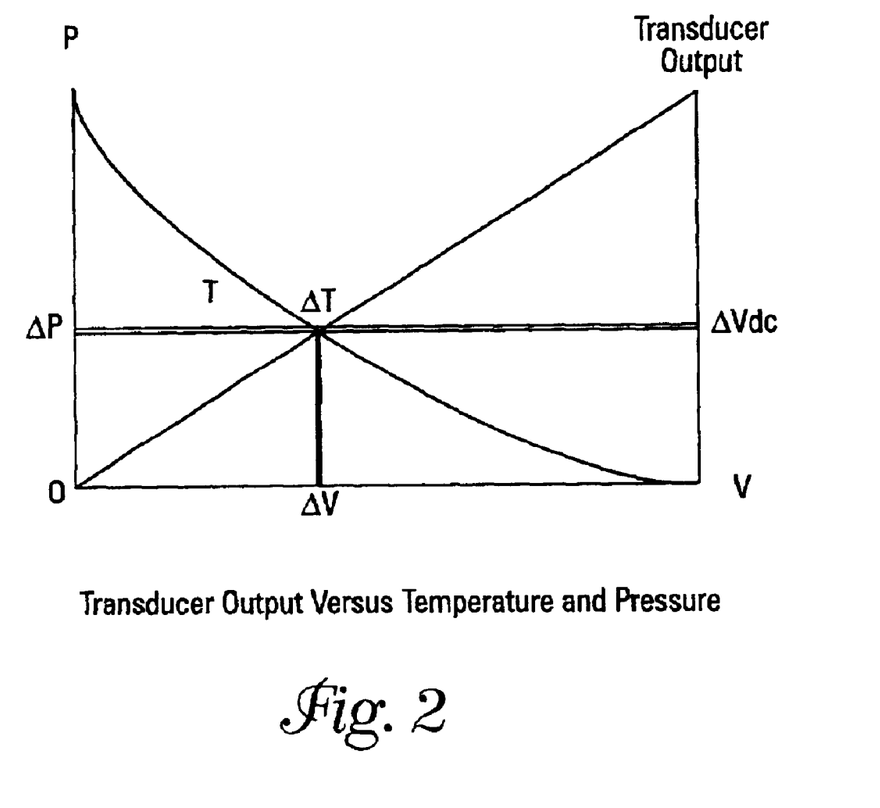
FIG. 2 illustrates a transducer output versus temperature and pressure.

The pressure change that occurs when the piston actuates will be a function of the ratio of the trapped volume before and after the piston stokes. If the equation of state of the compressible fluid is known, for example the laws of Charles and Gay-Lussac and Boyle for gases which are nearly perfect, then the effect of compressing the trapped volume can be readily estimated. The process of compression will be adiabatic (without heat transfer) during the piston motion. The gas will heat up, increasing in temperature. Since the heat capacity of the entrapped gas is much less than that of the surrounding valve, piston and transducer, the gas temperature will slowly decrease back to near the original temperature. This small temperature change when compared to the full range of the transducer, is miniscule in nature. This is shown in FIG. 2. If the assumption is made that any external temperature change during the short period of time (less than 30 seconds) required for the health check is small enough, its effects will be much lower than the specification of the transducer. The first part of this invention requires waiting for a sufficient time that the temperature returns to normal while another part requires capturing data during the piston actuation process.

The present invention is based on a principle that a change in an entrapped volume results in an equivalent known change in pressure. This uses the equations of state or physical laws put forth by Charles, Gay-Lussac, and Boyle for perfect gases, otherwise known as the Ideal Gas Law. For conservation of mass, this is described by equation 4 and may be used to acquire data to perform a health check through the use of linearity and hysteresis and repeatability.

$$\frac{p_i V_i}{T_i} = \frac{p_f V_f}{T_f} \tag{4}$$

$P_i$=Pressure after ball valve closure and piston withdrawn
$P_f$=Pressure after ball valve closure and piston advanced
$V_i$=Volume after ball valve closure and piston withdrawn
$V_f$=Volume after ball valve closure and piston advanced
$T_i$=Temperature after ball valve closure and piston withdrawn
$T_f$=Temperature after ball valve closure and piston advanced
If $T_i=T_f$, then equation (4) may be simplified to:

$$p_i V_i = p_f V_f \tag{5}$$

This means the principle of operation may be described as:

$$p_f = \frac{p_i V_i}{V_f} \tag{6}$$

It is possible, by a simple extension of this discussion, to use more accurate equations of state (other than the Ideal Gas Law) than stated above if they are known and required for the desired accuracy. The change in position of the piston changes the total entrapped volume between the ball valve and the diaphragm of the pressure transducer mounted to the remote health check device.

Prior to being sent on a mission or placed in use in the field, a full calibration is performed in a laboratory using the transducer and the fitting assembly to determine the change in pressure versus the change in volume. This is the baseline for all in situ calibrations done thereafter. These two devices are kept together as a unit, since any change in either device would destroy the baseline calibration.

The use of magnetics can be used to operate the piston and ball valve, thereby making a system with as few sources for leak as possible. The entire health check should take between 5 and 10 minutes plus the time required to communicate with the remote site.

Figure 3:
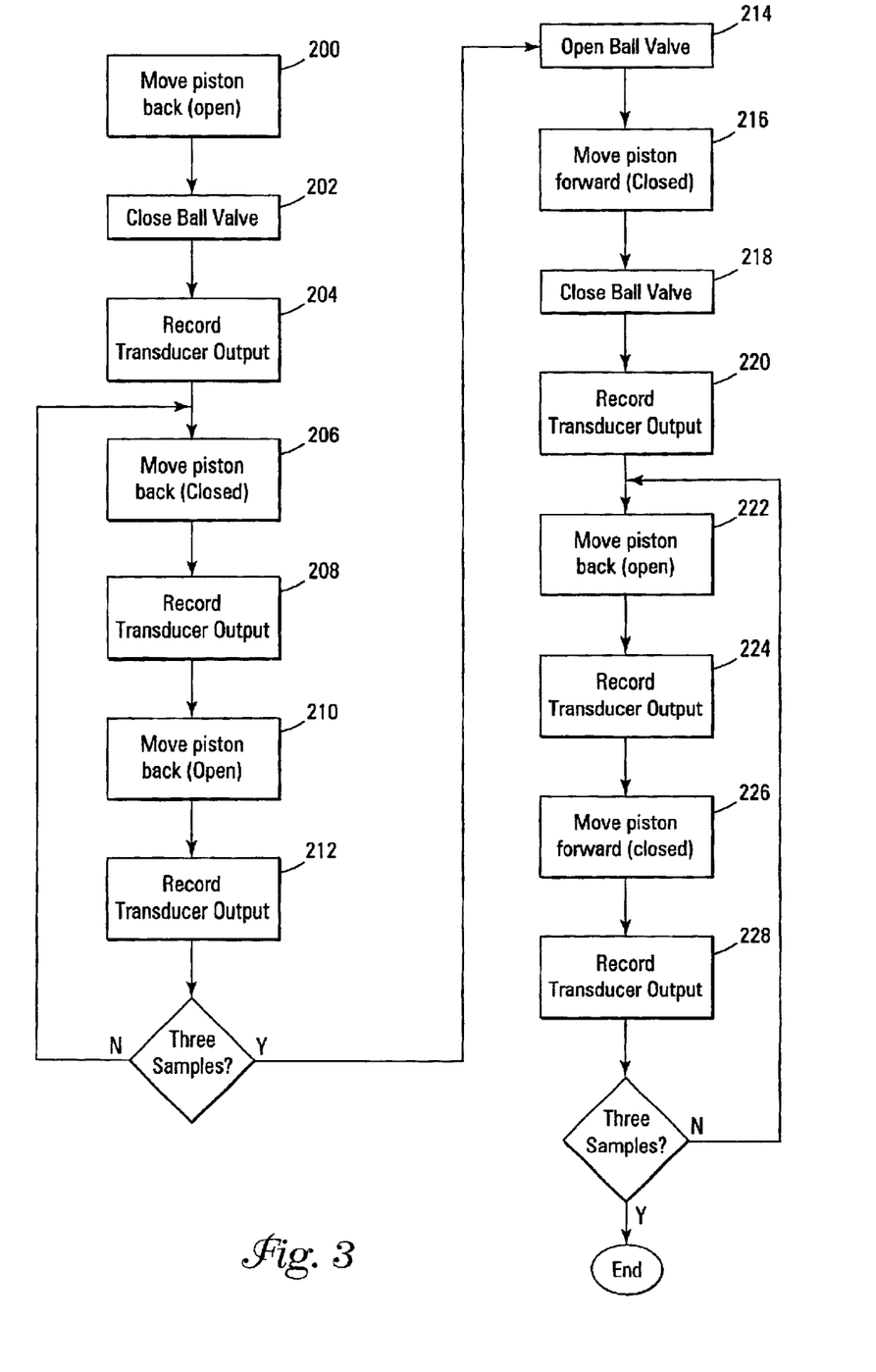
FIG. 3 is a flow chart of one test method of one embodiment of the present invention.

One test method is described with reference to FIG. 3. A process for checking a transducer begins with moving 200 the piston away from shoulder 116 (open) and then closing 202 the ball valve, trapping the pressure between the ball valve and the transducer diaphragm. The transducer output is then recorded 204. The piston is then closed 206, causing the pressure to increase in the fitting. After stabilization, the transducer output is then recorded 208. The piston is then placed 210 in the open position and, after stabilization, the transducer output is again recorded 212. This process can be repeated two additional times to record three sets of measurements.

The test continues by opening 214 the ball valve and moving the piston to the closed position 216. The ball valve is then re-closed 218 to trap the pressure between the ball valve and the transducer diaphragm. The transducer output is measured and recorded 220. The piston is placed 222 in the open position, causing the pressure to decrease, and the stabilized transducer output is recorded 224. Again, the piston is closed 226 and the stabilized transducer output is recorded 228. This process can be repeated two additional times to record three sets of measurements.

Figure 4:
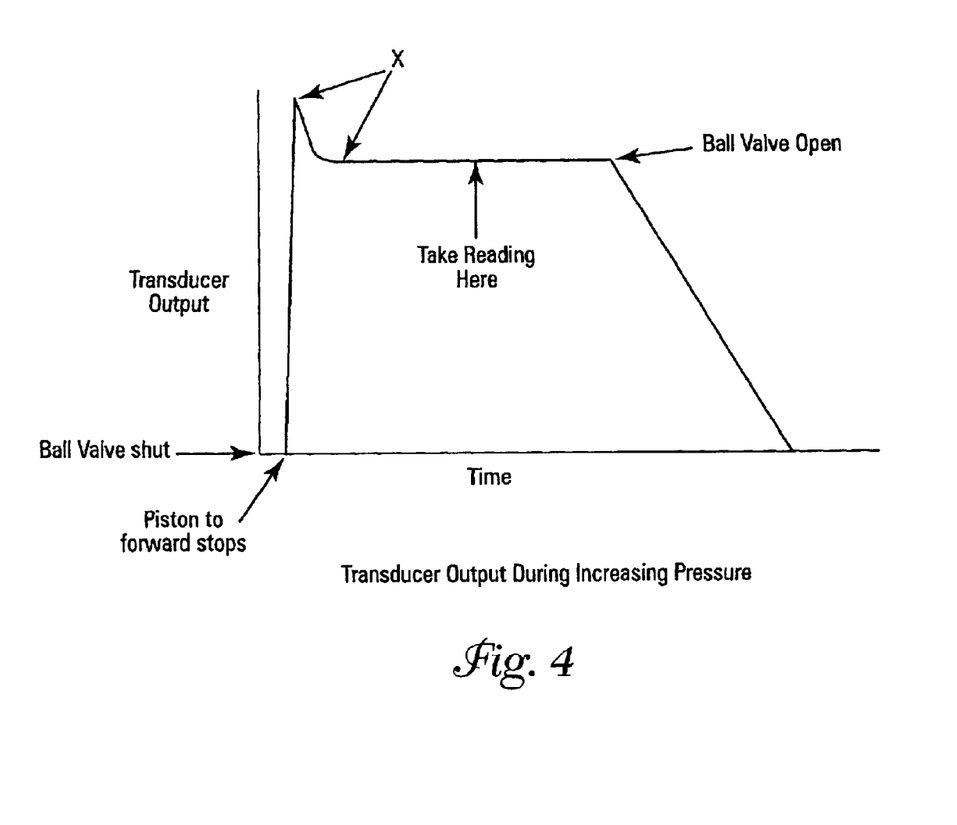
FIG. 4 illustrates a sample transducer output signal during increasing pressure.
Figure 5:
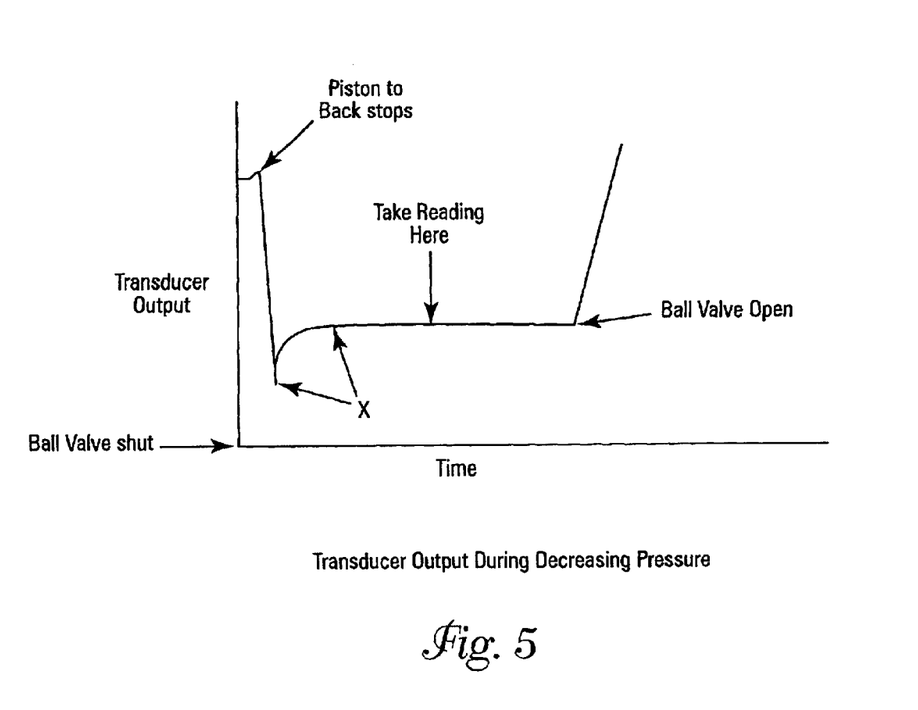
FIG. 5 illustrates a sample transducer output signal during decreasing pressure.

FIGS. 4 and 5 illustrate the basic response to increasing pressure and decreasing pressure, respectively. The spike on the left of the curve in FIG. 4 is due to the heat generated by the entrapped gas being compressed. Provided the temperature stays reasonably constant, the transducer output during a pressure increase will appear as shown in FIG. 5. After the transducer output has stabilized, a record of the reading is made. This should take no more than about 30 seconds.

The data recorded during the test operation can be reduced as follows. The span to be used for data reduction may be calculated by:

$$S=\text{average}(E_{oh})-\text{average}(E_{ol}) \tag{7}$$

S=Span over tested range
$E_{oh}$=Transducer output taken in step 208
$E_{ol}$=Transducer output taken in step 222
Nonlinearity may be calculated by:

$$NL = \text{absolute} \tag{8}$$

$$\left(\text{average}(E_{oc}) - \left(\left(\frac{\text{average}(E_{oh}) - \text{average}(E_{ol})}{2}\right) + \text{average}(E_{ol})\right)\right)$$

NL=Nonlinearity over the measured range
$E_{oc}$=Transducer output taken in steps 204, 212, 220, and 224
$E_{oh}$=Transducer output taken in step 208
$E_{ol}$=Transducer output taken in steps 222
The quantity NL is converted to percent of span by:

$$NL\ \% = \left(\frac{NL}{S}\right) * 100\% \tag{9}$$

NL%=Nonlinearity in percent of span
NL=Nonlinearity over the measured range (equation 8)
S=Span over tested range (equation 7)

The nonlinearity obtained by equation (9) should agree with the nonlinearity taken during the baseline calibration performed prior to the mission. Hysteresis may be calculated by:

$$Hys = \text{absolute}(\text{average}(E_{odn}) - \text{average}(E_{up})) \tag{10}$$

Hys=Hysteresis over the measured range
$E_{odn}$=Transducer output taken in step 212
$E_{oup}$=Transducer output taken in step 204
The quantity Hys is converted to percent of span by:

$$Hys\ \% = \left(\frac{Hys}{S}\right) * 100\% \tag{11}$$

Hys %=Hysteresis in percent of span
Hys=Hysteresis over the measured range (equation 10)
S=Span over tested range (equation 7)

The hysteresis obtained by equation (11) should agree with the hysteresis taken during the baseline calibration performed prior to the mission. Repeatability is obtained by taking the absolute difference of each run at the same stimulus. An example is the absolute difference of two recorded transducer outputs taken in step 212 when the piston is in the back position. The absolute difference between the data recorded during the first sample set and the absolute difference of the data from the second sample set, is processed as:

$$Rpt = \text{absolute}(E_{os}3 - E_o32) \tag{12}$$

Rpt=Repeatability
$E_{os}3$=Transducer output from step 212
$E_o32$=Transducer output from the second sample step 212
The quantity Rpt is converted to percent of span by:

$$Rpt\ \% = \left(\frac{Rpt}{S}\right) * 100\% \tag{13}$$

Rpt %=Repeatability in percent of span
Rpt=Repeatability over the measured range (equation 12)
S=Span over tested range (equation 7)

If the transducer's characteristics are identical to the baseline calibration data, it may be assumed the device is just as accurate as it was prior to the mission. If not, the amount of inaccuracy may be determined. Since the volume change and the speed at which the piston moves are consistent, the apparent maximum pressure (the peak shown in FIGS. 4 and 5) should be repeatable. If it is assumed the temperature of the gas and the surrounding materials is the same at the beginning of the compression/decompression stroke and the temperature rise due to piston movement is consistent, then the shape of the curve (marked X in FIGS. 4 and 5) will vary predictably with the mass of the gas. Since the actual pressure of the gas determines the mass of the entrapped commodity, the relationship between higher pressure and a longer decay time may be established.

Figure 6:
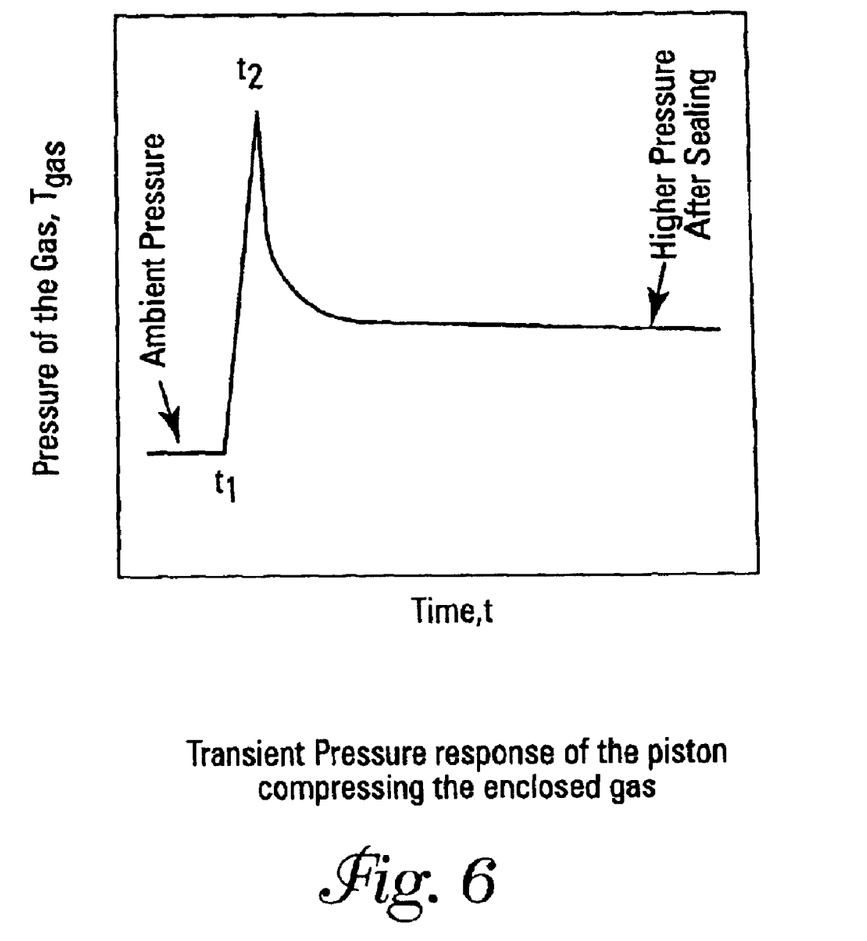
FIG. 6 illustrates a pressure response of a sample gas during piston compression of the test apparatus of FIG. 1.
Figure 7:
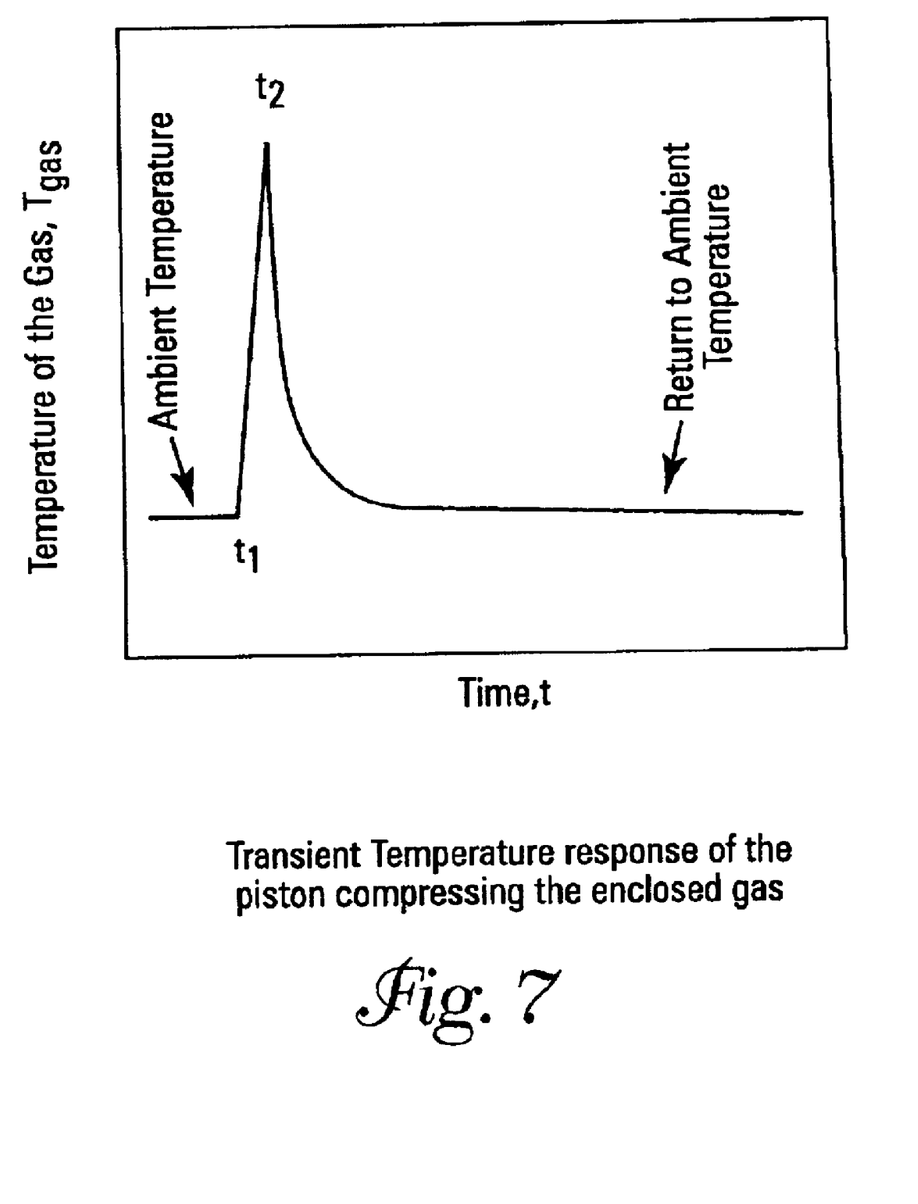
FIG. 7 illustrates a temperature response of a sample gas during piston compression of the test apparatus of FIG. 1.

FIG. 6 shows the transient pressure response and FIG. 7 shows the transient temperature response of a compression phase of the health check operation. Initially, the enclosed gas is at ambient pressure. From time $t_1$ to $t_2$, the piston is driven in, rapidly decreasing the enclosed volume. It is assumed that the time of compression, $t_2-t_1$, of the piston is small compared to the thermal relaxation of the system (for $t>t_2$) so that the compression is quasi-adiabatic. In both figures, the functional form of the pressure and temperature dependence during the compression ($t_1$ to $t_2$) is depicted linearly. It is noted that the volume dependence of neither is linear but instead is defined by the equation of state of the gas involved. The functional form from $t_1$ to $t_2$ is relevant for the method outlined here only in that the temperature and pressure are both increased above ambient.

For time $t>t_2$, the system is held at a fixed volume and allowed to cool back to ambient temperature. It is during this phase that additional information can be extracted (mostly because of the addition of a thermometer to the system). For $t>t_2$, the problem is that of a heated gas cooling at a fixed volume with the assumption that the transducer and health check setup are surrounded by an isothermal bath at temperature $T_{ambient}$. The simplest case is to model the gas as a "billet" that cools through its container (most probably a metallic pipe). As a first approximate, the rate of heat flow out of the system through the container into the surrounding thermal bath is governed by the equation:

$$Q = hA(T_{gas} - T_{ambient}) \tag{14}$$

where h is the heat transfer coefficient, A is the area of the container, $T_{gas}$ is the temperature of the gas, and $T_{ambient}$ is the temperature of the surrounding system. The rate of the change of the temperature can be set equal to equation (14) to obtain the following differential equation:

$$mc_v \frac{dT_{gas}}{dt} = hA(T_{gas} - T_{ambient}) \tag{15}$$

where m is the mass of the enclosed gas and $c_v$, is assumed to be known; and h and A are measured/calculated during calibration. Assuming the boundary condition that a time $t_2$ (in FIG. 6) the temperature of the gas is $T_0$, the solution to this differential equation is given by the following formula:

$$T_{gas} = (T_0 - T_{ambient})e^{-\frac{hA}{mc_v}(t-t2)} + T_{ambient} \tag{16}$$

If the temperature is sampled at a reasonable rate compared with the thermal relaxation time (i.e., if samplerate>>$hA/mc_v$), then the temperature decay for $t>t_2$ in FIG. 6 can be fit to equation (16) and the thermal relaxation time ($hA/mc_v$) can be extracted. What is most important is that from this fit the mass of the enclosed gas, m. can be determined. Using the mass of the enclosed gas, the volume of the container, and the equation of state of the gas, the pressure as a function of temperature (including the pressure before the piston compressed the gas) can be calibrated against the temperature transducer. For example, using the equation of state for an ideal gas, the pressure can be calculated using P=nRT/V. More accurate equations of state may also be used if desired or required.

The calculation of the ambient pressure from the time decay of the temperature relies on the assumption that the temperature calibration remains reliable. If there is a discrepancy between the calculated ambient pressure and the ambient pressure measured by the transducer, then it may be questionable whether the pressure transducer or the temperature transducer is out of calibration. There are several steps that can be taken to determine the health of each transducer.

Because for most equations of state pressure and temperature proportional to one another, the pressure should follow the same functional form as the temperature except that, after stabilizing, the pressure is now higher (the functional form of the temperature is shown in FIG. 6) Assuming that at $t_2$ the pressure is equal to $P_0$ and that after stabilization the new pressure is $P_{new}$, the pressure for $t>t_2$ is given by the following equation:

$$P_{gas} = (P_0 - P_{new})e^{-\frac{hA}{mc_v}(t-t2)} + P_{new} \tag{17}$$

By sampling the pressure as a function of time, one could fit an exponential to the pressure output and obtain another estimate of the mass, which should agree with that calculated from the temperature dependence as a function of time. The plot of pressure transducer output versus temperature transducer output with time as an implicit variable should trace the relationship of the equation of state for constant volume (typically linear).

If one of the transducers is malfunctioning and if it could be determined which transducer is malfunctioning, then one could still obtain both the temperature and pressure by solving the equation of state for the missing quantity. As an added health check, if the fit of equation (16) to the temperature transducer output is poor or the fit of equation (17) to the pressure transducer output is poor, this would be an indicator that the respective transducer is no longer linear and is malfunctioning. Of course, the technique described above would determine whether the pressure transducer is linear, but it cannot determine whether there is a constant offset error in the transducer output. The comparison of temperature and pressure through the equation of state would be able to determine if there was this type of offset.

Conclusion

A procedure for checking the health of a pressure transducer in situ is provided. The procedure includes measuring a fixed change in pressure above ambient pressure and a fixed change in pressure below ambient pressure. This is done by first sealing an enclosed volume around the transducer with a valve. A piston inside the sealed volume is then driven forward, compressing the enclosed gas, thereby increasing the pressure. A fixed pressure below ambient pressure is obtained by opening the valve, driving the piston forward, sealing the valve, and then retracting the piston. The output of the pressure transducer is recorded for both the overpressuring and the underpressuring. By comparing this data with data taken during a preoperative calibration, the health of the transducer is determined from the linearity, the hysteresis, and the repeatability of its output. The further addition of a thermometer allows constant offset error in the transducer output to be determined.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of in situ testing a pressure transducer comprising the steps of:
   measuring a first internal pressure in a fitting at a first internal volume of the fitting using the pressure transducer;
   changing the internal volume of the fitting to a second internal volume to change the internal pressure to a second internal pressure;
   measuring the second internal pressure in the fitting using the pressure transducer; and
   comparing the measured first and second internal pressures to historical pressure readings.

2. The method of claim 1, wherein the step of changing the volume of the fitting further comprises the step of moving a piston located within the fitting.

3. A method of in situ testing a pressure transducer comprising the steps of:
   measuring a first internal pressure in a fitting at a first internal volume of the fitting using the pressure transducer;
   changing the internal volume of the fitting to a second internal volume to change the internal pressure to a second internal pressure;
   measuring the second internal pressure in the fitting using the pressure transducer;
   comparing the measured first and second internal pressures to historical pressure reading; and
   sealing an input of the fitting prior to measuring the first internal pressure.

4. A method of in situ testing a pressure transducer comprising the steps of:
   measuring a first internal pressure in a fitting at a first internal volume of the fitting using a pressure transducer;
   changing the internal volume of the fitting to a second internal volume to change the internal pressure to a second internal pressure;
   measuring the second internal pressure in the fitting using the pressure transducer;
   comparing the measured first and second internal pressures to historical pressure readings; and
   calculating a sensitivity, repeatability and hysteresis for the transducer using the measured internal pressures.

5. The method of claim 4, further comprising the step of calculating linearity of the transducer using the measured internal pressures and a measured temperature.

6. A method of in situ testing a pressure transducer comprising the steps of:
   measuring a series of first internal pressures in a fitting at a first volume of the fitting using the pressure transducer;
   measuring a series of second internal pressures in the fitting at a second volume of the fitting using the pressure transducer; and analyzing and comparing the measured series of first and second internal pressures to historical data.

7. A method of in situ testing a pressure transducer comprising the steps of:

measuring a series of first pressures in a fitting at a first volume of the fitting using the pressure transducer;

measuring a series of second internal pressures in the fitting at a second volume of the fitting using the pressure transducer; and analyzing and comparing the measured series of first and second internal pressures to historical data;

wherein analyzing comprises determining sensitivity, linearity, hystersis, or repeatability of the transducer.

8. The method of claim 6, wherein the first and second volumes of the fitting are determined by a position of an internal piston of the fitting.

* * * * *